June 2, 1970 A. C. BARBER ET AL 3,514,850

ELECTRICAL CONDUCTORS

Filed Sept. 16, 1968

INVENTOR
ANTHONY CLIFFORD BARBER
LAURENCE REGINALD HAWTIN
BRYAN WILFRED HODSON LOWE
BY Cushman, Darby & Cushman
ATTORNEYS United States Patent Office
3,514,850
Patented June 2, 1970

3,514,850
ELECTRICAL CONDUCTORS

Anthony Clifford Barber, Lichfield, Laurence Reginald Hawtin, Birmingham, and Bryan Wilfred Hodson Lowe, Sutton Coldfield, England, assignors to Imperial Metal Industries (Kynoch) Limited, Birmingham, England, a corporation of Great Britain Filed Sept. 16, 1968, Ser. No. 760,007
Claims priority, application Great Britain, Sept. 28, 1967, 44,142/67
Int. Cl. H01v *11/00*
U.S. Cl. 29—599 9 Claims

ABSTRACT OF THE DISCLOSURE

A method of manufacturing an electrical conductor comprising locating at least one ductile superconductor member in a sheath comprising at least one metal selected from the group consisting of aluminium, silver, cadmium, indium, lead and tin, and providing the sheath with an exterior can of a ductile metal which will support the sheath, to produce an assembly, and subsequently working the assembly to reduce the cross-sectional dimensions of the superconductor member or members, the sheath and the can.

BACKGROUND OF THE INVENTION

This invention relates to the manufacture of electrical conductors comprising superconductor material in wire, rod or strip form, hereinafter referred to as a "superconductor core," provided with a sheath of stabilising material.

It has been proposed to manufacture electrical conductors of at least one "superconductor core" provided with a sheath of high conductivity copper as a stabilising material. The stabilising material has a stabilising effect upon the superconducting material, when the latter is superconducting, by minimising the effects of the randomly occurring flux jumps in the superconducting material which are encountered in practice. Without prejudice to the present invention this stabilising is thought to be effected by the thermal conductivity of the stabilising material, such that the heat produced by flux jumps and by the resistance ensuing from any part of the superconductor material commencing to conduct normally instead of in a superconductive manner, is conducted away and dissipated rapidly, and by its electrical conductivity by providing a low conductivity path to shunt any normal region of the superconductor, and thereby enable it to cool to be superconductive again.

Electrical conductors embodying superconductor material are of the greatest use when they are available in large lengths, so that it has been proposed to manufacture such electrical conductors by providing at least one superconductor member in a sheath of the high conductivity copper, followed by working of the resulting assembly into the required length. This co-working also has the effect of ensuring that the contact between the superconductor material and the copper has the lowest possible electrical and thermal resistance.

For co-working to be practicable, the metals concerned must be capable of deforming together at approximately the same rates, and this is so for high conductivity copper and ductile superconductor alloys, such as the superconductor alloy niobium 44 wt. percent titanium for example.

Other metals than high conductivity copper are thought to be acceptable replacements for the copper because they have adequate thermal and electrical conductivities, and may even be preferable in some circumstances. These metals are principally aluminium and also include silver, cadmium, indium, lead and tin, but these metals are softer than high conductivity copper and much softer than conventional superconductor alloy materials, such that it is believed that they cannot normally be co-worked with ductile superconductor alloys.

Thus it is an object of the invention to provide a method of manufacturing, by a co-processing route, an electrical conductor comprising at least one "superconductor core" with a sheath comprising at least one metal selected from the group consisting of aluminium, silver, cadmium, indium, lead and tin.

SUMMARY OF THE INVENTION

In accordance with the invention a method of manufacturing an electrical conductor comprises locating at least one ductile superconductor member in a sheath comprising at least one metal selected from the group consisting of aluminium, silver, cadmium, indium, lead and tin, and providing the sheath with an exterior can of a ductile metal which will support the sheath, to produce an assembly, and subsequently working the assembly to reduce the cross-sectional dimensions of the superconductor member or members, the sheath and the can.

Preferably the superconductor member or members is or are metallurgically bonded to the sheath during working.

Preferably also the superconductor member or members are heated to a temperature of at least 250° C. and are then inserted in the sheath to form a sub-assembly, and the sub-assembly is immediately extruded to metallurgically bond the superconductor member or members to the sheath.

Preferably further, the sub-assembly is provided with the exterior can prior to extrusion, and the resulting assembly is immediately extruded to metallurgically bond the superconductor member or members to the sheath, or the extruded sub-assembly is provided with the exterior can to produce an assembly.

Alternatively the assembly is drawn to metallurgically bond the superconductor member or members to the sheath.

Preferably also, subsequent to working of the assembly to produce the electrical conductor, the can is removed to leave the sheath containing at least one "superconductor core."

If the material of the can is suitable, for example by choosing high conductivity copper, it may be permitted to remain on the exterior of the sheath.

If required to assist bonding of the sheath to the superconductor member or members, the sheath may comprise an inner layer of high conductivity copper whereby the inner layer is capable of being bonded to the superconductor material.

BRIEF DESCRIPTION OF THE DRAWINGS

Typical examples of the invention and modifications thereof will now be more particularly described with reference to the accompanying diagrammatic drawings, in which.

DESCRIPTION OF THE PREFERRED EMBODIMENTS

Figures 1, 2, 3, 4, 5, 6:
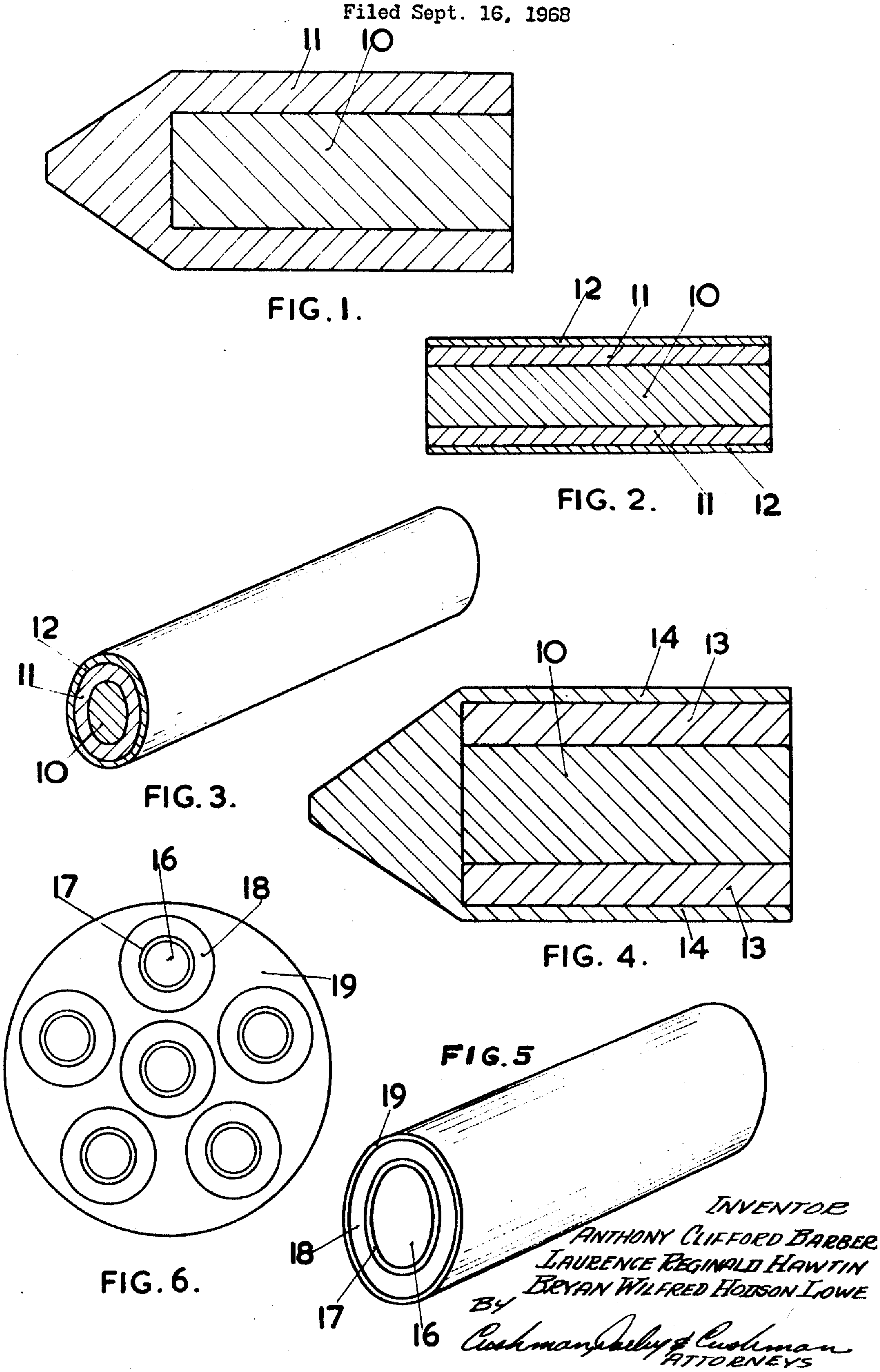
FIG. 1 is a sectional view of an extrusion workpiece of a first example.
FIG. 2 is a sectional view of the extruded product of the workpiece of FIG. 1 provided with an exterior can.
FIG. 3 is a perspective view on a greatly enlarged scale of the assembly of FIG. 2 after drawing.
FIG. 4 is a sectional view of an extrusion workpiece of a modification of the first example.
FIG. 5 is a perspective view of a workpiece of another example of the invention.
FIG. 6 is an end elevation on a greatly enlarged scale of an assembly using the workpiece of FIG. 5.

Referring initially to FIGS. 1–3, in a first example of the invention a method of manufacturing an electrical conductor comprises taking a bar 10 of the superconductor alloy niobium 44 wt. percent tittanium, heating it to a temperature in the range 250–650 C., preferably 450–550° C., and as soon as that temperature is attained, locating it in a sheath of aluminium 11 which is at room temperature to form the extrusion workpiece of FIG. 1. Immediately that this has been accomplished, the super conductor bar 10 is bonded to the aluminium sheath 11 by co-extrusion using an extrusion ratio of 7:1. By heating the superconductor bar 10 to this temperature, its hardness is reduced so that there is less disparity between the hardnesses of the aluminium and the superconductor alloy. In this way the two metals can be extruded together quite successfully.

The aluminium sheath is then provided with a can 12 of high conductivity copper by being pressed into a tube of the latter. In this typical example the overall diameter of the assembly thus produced is about 2", the superconductor bar has a diameter of about 1", and the can has a wall thickness of approximately ⅛". This is shown in FIG. 2.

The use of the can 12 around the exterior of the soft aluminium sheath 11 now enables the assembly to be co-processed in a conventional manner. Thus, the leading end is swaged and it is drawn through as many dies as necessary to reduce it to the requisite cross-sectional dimensions. In this way a great length of composite superconductor wire is produced, as shown in FIG. 3.

Without the use of the can 12 the soft aluminium would be reduced in its cross-sectional dimensions at a greater rate than the relatively hard superconductor alloy because it would flow relative to the superconductor alloy. Without prejudice to the validity of this patent application it is thought that, because the aluminium is in contact with and confined by the can, it is restrained from relative movement, and supported, by the two opposed surfaces of the superconductor material and the can.

If required, the high conductivity copper can 12 may be permitted to remain on the exterior of the sheath 11, such that it adds to the stabilising effect of the aluminium, increases strength and also protects the relatively soft aluminium from damage during handling, but it may be removed if required. Thus, in a modification of the invention, in which it is intended that the can shall eventually be removed, relatively expensive copper can be replaced by another supporting metal such as mild steel, and this is then removed after working, Removal may be carried out in any one of the conventional ways whilst preventing damage to the aluminium; thus if copper is to be removed, the conductor may be passed through nitric acid to pickle off the copper.

In this example aluminium has been selected as the "soft metal" from amongst the possibilities of aluminium, silver, cadmium, indium, lead and tin because it is relatively inexpensive, but these other metals may be used provided that they do not melt at any temperatures to which they are subjected. In addition, aluminium has the advantage that it has a low magnetoresistance whereby its resistance does not increase to any substantial degree as the magnetic field to which it is subjected increases. It is for this reason that aluminium is preferred to copper which has a high magnetoresistance; the resistance of aluminum and high conductivity copper at cryogenic temperatures in zero magnetic field do not differ to any substantial degree. This means that, because the superconductor wire is intended to withstand high magnetic fields, there does not have to be so great a volume of stabilising material, if aluminium is used, to provide an adequate shunt path when compared to the situation in which high conductivity copper is used. In addition aluminium is lighter in weight than high conductivity copper.

Referring now to FIG. 4 of the drawings, in this modification an extrusion workpiece is prepared in which the heated supercoductor bar 10 is placed in an aluminium tube 13 within an extrusion can 14 of high conductivity copper. The workpiece is immediately extruded with a 7:1 ratio before too much heat is transferred from the bar 10 to the aluminium tube 13. After extrusion the assembly is already provided with the copper can in contrast to the addition thereof at that stage described in the first example. The assembly is then swaged and drawn to produce the composite superconductor wire shown in FIG. 3.

In a second example of the invention, the initial stage of extruding hot superconductor material in ambient temperature aluminum is obviated by drawing the superconductor member in the aluminium sheath, within a high conductivity copper can, all materials being at ambient temperatures. This will usually produce a metallurgical bond between the aluminium and the suppperconductor material, but if difficulties are encountered in obtaining a satisfactory bond between the superconductor material and the aluminium, the sheath may be provided with an inner layer of high conductivity copper which contacts the superconductor material and bonds thereto and to the soft aluminium of the sheath. FIG. 5 illustrates this assembly, showing the superconductor bar 16, an inner layer of copper 17, an outer layer of aluminium 18 and a copper can 19.

The electrical conductor manufactured as described can be adapted to contain a plurality of filaments of the superconductor material by halting the processing of the assembly at an intermediate stage, removing the can or retaining it if it is of high conductivity copper, bundling a number of lengths of the assembly together in a further can, and co-processing the complete assembly. If the original can material is high conductivity copper, and the can of the new assembly is of the same material, co-processing needs to be carried out initially at at least 300° C. to provide bonding of copper to copper. However, it must be borne is mind that the melting point of aluminium must not be exceeded because of the evidently disruptive effect which would ensue, and this is also of importance when considering the superconductor alloy to be chosen. No superconductor alloy can be chosen which entails a heat-treatment at a temperature higher than the melting point of the soft metal selected. In addition, temperatures should be avoided which might entail melting of any alloys formed between the soft metal and its neighbouring metals, or which might be conductive to high diffusion rates therebetween.

FIG. 6 illustrates the cross-section of the resulting conductor when six lengths of the composite described in relation to FIG. 5 are assembled in a copper can with copper packing pieces, and the resulting assembly is co-worked. It will be noted that the contacting copper components are completely bonded together.

We claim:

1. A method of manufacturing an electrical conductor comprising: heating at least one ductile superconductor member to a temperature of at least 250° C.; inserting the heated member in a sheath comprising at least one metal which is relatively soft compared to the superconductor metal, said metal being selected from the group consisting of aluminium, silver, cadmium, and lead to provide a sub-assembly; immediately extruding the sub-assembly to metallurgically bond the member to the sheath; providing the sheath with an exterior can of a ductile metal which is relatively hard compared to the sheath metal and which supports the sheath and prevents flow of the relatively soft sheath metal relative to the superconductor metal during working, to produce an assembly, and subsequently working the assembly to reduce the cross-sectional dimensions of the superconductor member, the sheath and the can.

2. A method as in claim 1 wherein the subassembly is provided with the exterior can prior to extrusion.

3. A method as in claim 1 wherein the sub-assembly is provided with the exterior can after extrusion of the sub-assembly.

4. A method as in claim 1 wherein the material of the ductile superconductor member is the alloy niobium–44 weight percent titanium.

5. A method as in claim 1 wherein the step of working the assembly includes a drawing operation.

6. A method as in claim 1 wherein the sheath consists of aluminum.

7. A method as in claim 1 wherein the sheath consists of an outer layer of aluminum for contacting the can and an inner layer of high conductivity copper for contacting the superconductor member.

8. A method as in claim 1 wherein the can metal is selected from the group consisting of mild steel or high conductivity copper.

9. A method as in claim 1 wherein the material of the superconductor member is the alloy niobium–44 weight percent titanium and wherein said member is heated to 250–650° C. before insertion into the sheath.

References Cited

UNITED STATES PATENTS

| | | | |
|---|---|---|---|
| 3,109,963 | 11/1963 | Gebaue | 29—599 X |
| 3,293,008 | 12/1966 | Allen et al. | 29—599 X |
| 3,370,347 | 2/1968 | Garwin et al. | 29—599 |

PAUL M. COHEN, Primary Examiner

U.S. Cl. X.R.

29—194, 197, 199